United States Patent
Ault et al.

(10) Patent No.: US 8,239,430 B2
(45) Date of Patent: Aug. 7, 2012

(54) ACCURACY IMPROVEMENT IN CORDIC THROUGH PRECOMPUTATION OF THE ERROR BIAS

(75) Inventors: David N. Ault, Austin, TX (US); Emiliano Lozano, Austin, TX (US); Bao G. Truong, Austin, TX (US); Samuel I. Ward, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1016 days.

(21) Appl. No.: 11/869,022

(22) Filed: Oct. 9, 2007

(65) Prior Publication Data

US 2009/0094307 A1   Apr. 9, 2009

(51) Int. Cl.
G06F 7/00       (2006.01)

(52) U.S. Cl. ........................... 708/200; 708/441

(58) Field of Classification Search .......... 708/200–209, 708/442, 446
See application file for complete search history.

(56) References Cited

U.S. PATENT DOCUMENTS

| 4,084,254 | A | 4/1978 | Birney et al. | |
| 4,356,559 | A | 10/1982 | Candy et al. | |
| 5,552,722 | A | 9/1996 | Kean | |
| 6,347,325 | B1 * | 2/2002 | Ribner et al. | 708/271 |
| 6,466,958 | B1 | 10/2002 | Van Wechel et al. | |
| 6,883,013 | B1 * | 4/2005 | Dong | 708/303 |
| 6,941,335 | B2 | 9/2005 | Dhong et al. | |
| 7,327,783 | B2 * | 2/2008 | Sullivan | 708/622 |
| 7,698,353 | B2 | 4/2010 | Tan et al. | |
| 7,797,516 | B2 | 9/2010 | Froemming et al. | |
| 7,818,357 | B2 * | 10/2010 | Bredehoft | 708/233 |
| 7,870,182 | B2 | 1/2011 | Thendean et al. | |
| 2003/0101207 | A1 | 5/2003 | Dhong et al. | |
| 2004/0207392 | A1 * | 10/2004 | Kernhof | 324/207.25 |
| 2006/0230096 | A1 | 10/2006 | Thendean et al. | |
| 2007/0061391 | A1 | 3/2007 | Tan et al. | |
| 2007/0130241 | A1 * | 6/2007 | Bredehoft | 708/441 |
| 2007/0198625 | A1 * | 8/2007 | Torosyan | 708/490 |
| 2008/0229075 | A1 | 9/2008 | Froemming et al. | |

OTHER PUBLICATIONS

Hu, "The Quantization Effects of the CORDIC Algorithm," Department of Electrical and Computer Engineering, University of Wisconsin—Madison, IEEE Transactions on Signal Processing, vol. 40, No. 4, Apr. 1992, pp. 834-844.
Dawid et al., "VLSI Implementation of the CORDIC Algorithm Using Redundant Arithmetic," Proceedings of 1992 IEEE International Symposium on Circuits and Systems, San Diego, CA, pp. 1089-1092.
Volder, "The CORDIC Trigonometric Computing Technique," IRE Trans. Electronic Computing, vol. EC-8, pp. 330-334, Sep. 1959.
Walther, "A Unified Algorithm for Elementary Functions," in AFIPS Spring Joint Computer Conference, vol. 38, 1971, pp. 379-385.
Hu et al., "A Neglected Error Source in the CORDIC Algorithm," Circuits and Systems, 1993. ISCAS '93, 1993 IEEE International Symposium on May 3-6, 1993, pp. 766-769.
Kota et al., "Numerical Accuracy and Hardware Tradeoffs for CORDIC Arithmetic for Special-Purpose Processors," IEEE Transactions on Computers, vol. 42, Issue 7, Jul. 1993, pp. 769-799.
King, "A Reduced Complexity Truncated Multiplier," Master's Thesis, The University of Texas at Austin, Aug. 1998, 68 pages.
USPTO office action for U.S. Appl. No. 11/869,029 dated Mar. 21, 2011.

* cited by examiner

*Primary Examiner* — Lewis A Bullock, Jr.
*Assistant Examiner* — Michael D Yaary
(74) *Attorney, Agent, or Firm* — Yee & Associates, P.C.

(57) ABSTRACT

Performing a calculation using a coordinate rotation digital computer (CORDIC) algorithm. Execution of the CORDIC algorithm is begun. An error introduced by a truncated vector as a result of executing the CORDIC algorithm is pre-computed. The error is incorporated into a subsequent iteration of the CORDIC algorithm. Execution of the CORDIC algorithm is completed. The result of the CORDIC algorithm is stored.

9 Claims, 3 Drawing Sheets

400

| PRE NORM. | | WORST CASE X ERROR (ulp) | | |
|---|---|---|---|---|
| REG SIZE | # OF ITERATIONS | SIM. STD. ERROR | SIM. MOD. ERROR 1ulp | SIM. MOD. ERROR 2ulp |
| 32 BITS | 33 | 13 | 6 | 4 |
| | 32 | 13 | 6 | 4 |
| | 31 | 13 | 6 | 4 |
| | 30 | 14 | 7 | 5 |
| | 29 | 15 | 9 | 7 |
| 23 BIT | 24 | 11 | 6 | 3 |
| | 23 | 11 | 6 | 3 |
| | 22 | 10 | 6 | 4 |
| | 21 | 11 | 7 | 5 |
| | 20 | 12 | 9 | 7 |

| PRE NORM. | | WORST CASE Y ERROR (ulp) | | |
|---|---|---|---|---|
| REG SIZE | # OF ITERATIONS | SIM. STD. ERROR | SIM. MOD. ERROR 1ulp | SIM. MOD. ERROR 2ulp |
| 32 BITS | 33 | 13 | 7 | 3 |
| | 32 | 13 | 7 | 3 |
| | 31 | 13 | 7 | 4 |
| | 30 | 14 | 8 | 5 |
| | 29 | 15 | 9 | 7 |
| 23 BIT | 24 | 11 | 6 | 3 |
| | 23 | 11 | 6 | 3 |
| | 22 | 11 | 6 | 4 |
| | 21 | 11 | 7 | 5 |
| | 20 | 12 | 9 | 7 |

*FIG. 5*

ACCURACY IMPROVEMENT IN CORDIC THROUGH PRECOMPUTATION OF THE ERROR BIAS

BACKGROUND OF THE INVENTION

1. Field of the Invention

The present invention relates generally to an improved data processing system and in particular to devices and methods for performing calculations more efficiently. Still more particularly, the present invention relates to improved techniques for more efficient calculation of coordinate rotation digital computer (CORDIC) algorithm rotation angles.

2. Description of the Related Art

A problem often confronted in computing is how to implement calculation of mathematical functions. Many mathematical functions cannot be calculated directly, but rather numerical techniques are employed to approximate answers to the mathematical function.

One technique for solving mathematical functions on a computer is known as the coordinate rotation digital computer (CORDIC) algorithm. The CORDIC algorithm is an iterative arithmetic algorithm. The CORDIC algorithm is an efficient method for computing many complex mathematical functions, such as, but not limited to, lattice filters, QR factorizations, sine functions, cosine functions, fast Fourier transformations, and generally transcendental functions that cannot be constructed from a finite combination of constant algebraic, exponential, logarithmic functions and field operations. The CORDIC algorithm is commonly used in digital signal processing and in graphical processing.

The basic task performed by the CORDIC algorithm is to rotate a 2 by 1 vector through an angle using a linear, circular, or hyperbolic coordinate system. The CORDIC algorithm rotates the vector through a sequence of elementary angles whose algebraic sum approximates the desired rotation angle. These elementary angles have the property that the vector rotation through each of them may be computed easily with a single shift and add operation. This formulation of CORDIC algorithm leads to a unified procedure to compute a wide range of complex mathematical functions using a fixed number of shifts and add computing steps.

However, the CORDIC algorithm is an inherently inaccurate calculation having three main error types introduced from the quantization effects of implementing the CORDIC algorithm. The first type of error occurs from the quantization of the rotation angle. The second type of error arises from rounding numbers of the finite precision arithmetic used when executing the CORDIC algorithm. The third type of error arises from the rotation angle quantization, which arises from the rotation angle being incorrectly represented by the wrong sign.

SUMMARY OF THE INVENTION

The illustrative embodiments described herein provide for a method, computer usable program code and data processing system for performing a calculation using a coordinate rotation digital computer (CORDIC) algorithm. Execution of the CORDIC algorithm is begun. An error introduced by a truncated vector as a result of executing the CORDIC algorithm is pre-computed. The error is incorporated into a subsequent iteration of the CORDIC algorithm. Execution of the CORDIC algorithm is completed. The result of the CORDIC algorithm is stored.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 is a table comparing errors generated using a prior art CORDIC algorithm versus using the improved CORDIC algorithm shown in FIG. 3, in accordance with an illustrative embodiment; and FIG. 5 is a table comparing errors generated using a prior art CORDIC algorithm versus using the improved CORDIC algorithm shown in FIG. 4, in accordance with an illustrative embodiment.

DETAILED DESCRIPTION OF THE PREFERRED EMBODIMENT

Figure 1:
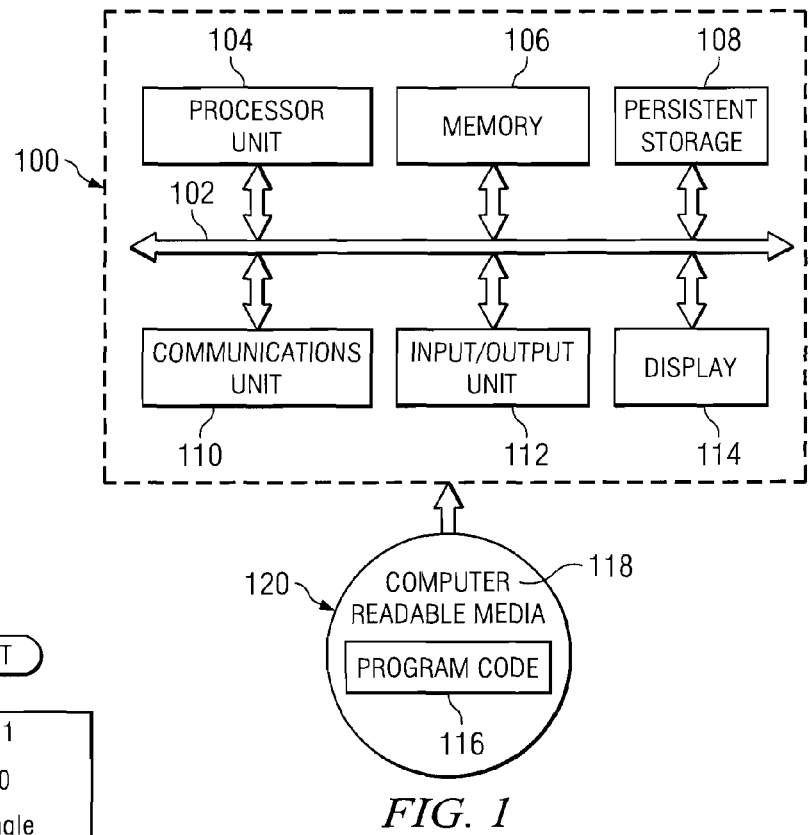
FIG. 1 is a diagram of a data processing system, in accordance with an illustrative embodiment.

FIG. 1 is a diagram of a data processing system, in accordance with an illustrative embodiment. In an illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 may be, for example, a random access memory or other form of volatile memory. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard and mouse. Further, input/output unit 112 may send output to a printer. Display 114 provides a mechanism to display information to a user.

Instructions for the operating system and applications or programs are located on persistent storage 108. These instructions may be loaded into memory 106 for execution by processor unit 104. The processes of the different embodiments may be performed by processor unit 104 using computer implemented instructions, which may be located in a memory, such as memory 106. These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 116 is located in a functional form on computer readable media 118 and may be loaded onto or transferred to data processing system 100 for execution by processor unit 104. Program code 116 and computer readable media 118 form computer program product 120 in these examples. In one example, computer readable media 118 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 118 also may take the form of a persistent storage, such as a hard drive or a flash memory that is connected to data processing system 100. The tangible form of computer readable media 118 is also referred to as computer recordable storage media.

Alternatively, program code 116 may be transferred to data processing system 100 from computer readable media 118 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown.

For example, a bus system may be used to implement communications fabric 102 and may comprise one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

The illustrative embodiments described herein provide for a method, computer usable program code and data processing system for performing a calculation using a coordinate rotation digital computer (CORDIC) algorithm. Execution of the CORDIC algorithm is begun. An error introduced by a truncated vector as a result of executing the CORDIC algorithm is pre-computed. The error is incorporated into a subsequent iteration of the CORDIC algorithm. Execution of the CORDIC algorithm is completed. The result of the CORDIC algorithm is stored.

Figure 2:
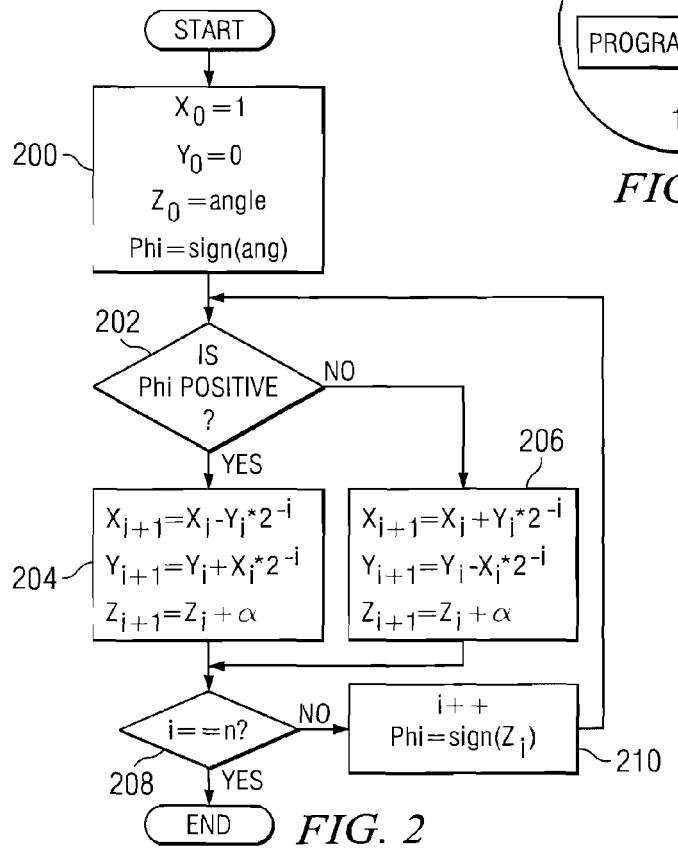
FIG. 2 is a flowchart of a prior art CORDIC algorithm in which aspects of the present invention may be implemented.

FIG. 2 is a flowchart of a prior art CORDIC algorithm in which aspects of the present invention may be implemented. The process shown FIG. 2 can be implemented in a data processing system, such as data processing system 100 shown in FIG. 1. Specifically, the process shown in FIG. 2 can be implemented using a processor.

The standard CORDIC algorithm shown in FIG. 2 uses a set of three equations to iteratively rotate, from i=1 ... N, a vector by a given angle. The form of these equations are given below, where $X_0, Y_0$ is the original vector and $Z_0$ is the initial angle.

$$X_{i+1} = X_i - /+ \sigma_j Y_i * 2^{-i} \quad (1)$$

$$Y_{i+1} = Y_i + /- \sigma_j X_i * 2^{-i} \quad (2)$$

$$Z_{i+1} = Z_i - \sigma_j \tan^{-1}(2^{-i}) \quad (3)$$

Note that the terms "−/+" and "+/−" are used deliberately in order to indicate that the value of the sign depends on the sign of $Z_{i+1}$.

The only arithmetic operations required to calculate the new vector coordinates, $X_i$ and $Y_i$, are shifts and adds of the previous vector coordinates. The new values of the angle $Z_i$ are calculated by summing stored values of $\tan^{-1}(2^{-i})$. The value of $\sigma_i$ depends on the residual angle. If $Z_j \mu 0$, then $\sigma_j=1$; if $Z_j<0$, then $\sigma_j=-1$.

In the process shown in FIG. 2, the subsequent vector $\{X_i, Y_i\}$ is calculated by adding the current value of the vector to the shifted value of the opposite coordinate value. For each subsequent iteration, the $\{X_i, Y_i\}$ values are shifted by I bit positions. In a finite precision processor with N fractional bits, there are N−2 additions that can potentially introduce truncated error.

The process begins as the processor sets $X_0=1$, $Y_0=0$, $Z_0$=the initial angle, and Phi as having an initial sign of the angle (either −1 or +1) (step 200). The processor then determines if Phi is positive (step 202). If Phi is positive, then the processor calculates a current iteration of equations (1), (2), and (3) in the form of:

$$X_{i+1} = X_i - Y_i * 2^{-i} \quad (4)$$

$$Y_{i+1} = Y_i + X_i * 2^{-i} \quad (5)$$

$$Z_{i+1} = Z_i + \acute{\alpha} \quad (6)$$

wherein $\acute{\alpha} = -\sigma_j \tan^{-1}(2^{-1})$ (step 204). However, if Phi is negative in step 202 (a "no" result), then the processor calculates a current iteration of equations (1), (2), and (3) in the form of:

$$X_{i+1} = X_i + Y_i * 2^{-i} \quad (7)$$

$$Y_{i+1} = Y_i - X_i * 2^{-i} \quad (8)$$

$$Z_{i+1} = Z_i + \acute{\alpha} \quad (9)$$

wherein $\acute{\alpha} = -\sigma_j \tan^{-1}(2^{-1})$ (step 206).

From either step 204 or 206, the processor determines whether the value of "i" has reached the value of "N," which is a number representing the final iteration (step 208). If the final iteration has not been reached (a "no" result to step 208), then the processor increments the value of "i" and sets Phi=sign($Z_i$) (step 210). The process then returns to step 202 and repeats. However, if the final iteration has been reached (a "yes" result to step 208), then the process terminates.

Figure 3:
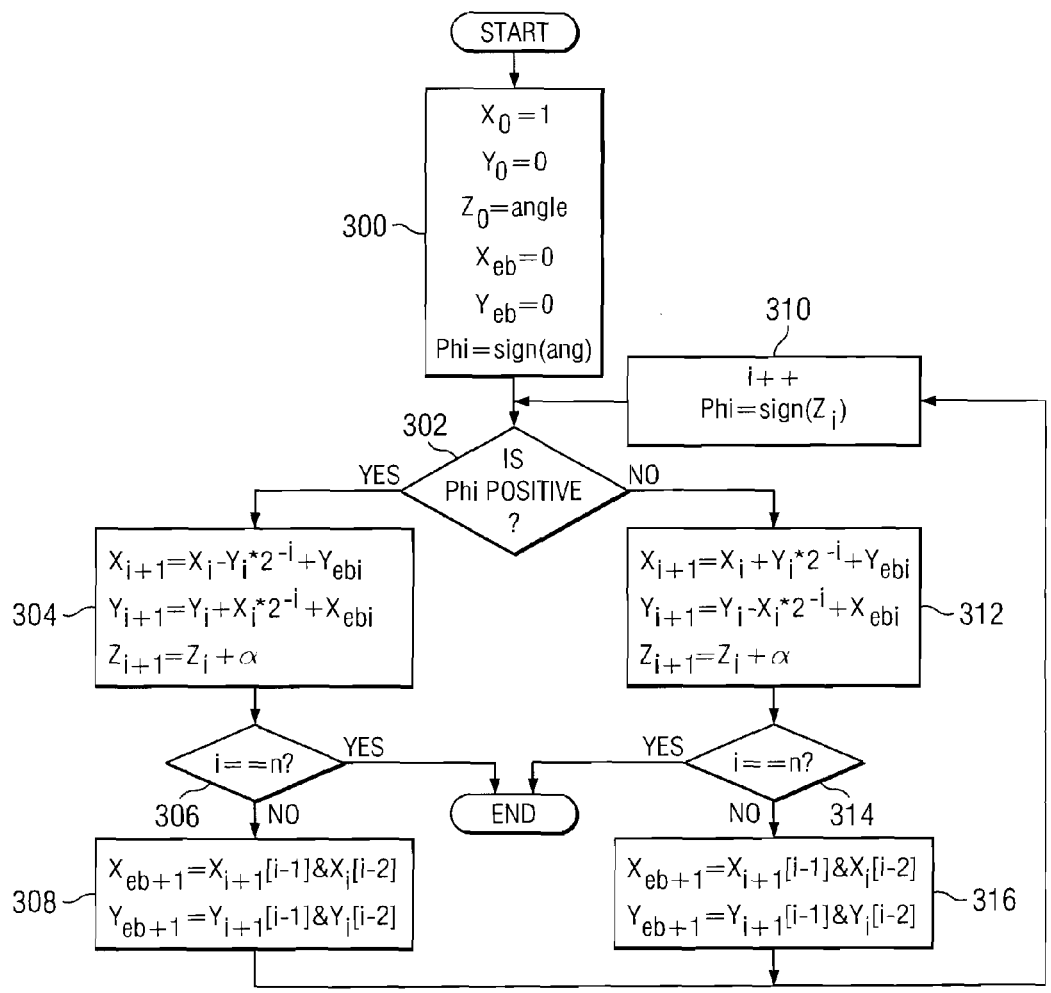
FIG. 3 is a flowchart of an improved CORDIC algorithm, in accordance with an illustrative embodiment.

FIG. 3 is a flowchart of an improved CORDIC algorithm, in accordance with an illustrative embodiment. The process shown in FIG. 3 can be implemented in a data processing system, such as data processing system 100 shown in FIG. 1. Specifically, the process shown in FIG. 3 can be implemented using a processor.

As often occurs during execution of the CORDIC algorithm, the truncated values would have generated a carry into the Unit of Least Position of the intermediate stage; however, this accuracy is lost with the traditional CORDIC algorithm shown in FIG. 3. The illustrative embodiments modify the CORDIC equations (1), (2), and (3) to take into consideration these error conditions without adding delay to the overall calculation.

The methods of the illustrative embodiments increase the effective width of an N-bit finite precision CORDIC sequence by pre-computing the error introduced by the truncated vector, which is denoted as the error bias (Eb). In the modified equations that follow, the "&" symbol is used to indicate the logical AND operation:

$$X_{i+1}=X_i -/+ Y_i *2^i + (Y_i[i-1] \& Y_{i+1}[i-2]) \quad (10)$$

$$Y_{i+1}=Y_i !/ X_i *2^i + (X_i[i-1] \& X_{i+1}[i-2]) \quad (11)$$

The symbols "−/+" and "+/−" are used deliberately to indicate that $X_i$ is opposite of $Y_i$.

With this modification to the CORDIC equations, the effective width of the fixed-width vector is increased to N+1. This illustrative example can also be extended past one bit to multiple bit positions for increased accuracy. The illustrative methods have been verified for N+1 and N+2.

An advantage of the illustrative examples is that the error bias can be pre-computed during the computation of the $Y_i$ and $X_i$ terms so that no additional delay is added to the carry propagation path that is the critical path of the CORDIC iterative equations. Another advantage of the illustrative examples is that the inherent error in the CORDIC algorithm can be reduced, possibly by 50% or more. In other words, not only does the CORDIC algorithm of the illustrative embodiments increase the effective width of an adder, which thereby improves the accuracy of the CORDIC calculation, the illustrative embodiments do so at no delay penalty.

Avoidance of delay penalties is accomplished by pre-computation of an $E_b$ term, as defined in equations (12) and (13). The $X_{eb}$ and $Y_{eb}$ equations are as follows:

$$X_{eb}=X_i[0] \& Y_i[i-1] \quad (12)$$

$$Y_{eb}=Y_i[0] \& X_i[i-1] \quad (13)$$

In every instance, except for the last iteration, the $Y_i[i-1]$ and $X_i[i-1]$ terms are calculated before the carry propagation completes. This calculation is shown in the flowchart of FIG. 3.

As stated above, for the case where the iteration is on the last loop, the $X_i[i+1]$ and the $Y_i[i+1]$ terms will arrive shortly after the complete carry propagation. In this case, the final error bias is not needed because no further iterations will occur. Thus, the critical path is always the carry propagation through the sum of the traditional CORDIC equations.

In the process shown in FIG. 3, the error bias is computed and added at each iteration of CORDIC. However, error bias is not computed and added at the last iteration because the computation and addition are no longer useful.

In any case, the process begins as the processor sets $X_0=1$, $Y_0=0$, $Z_0=$the initial angle, $X_{eb}=0$ and $Y_{eb}=0$. and Phi as having an initial sign of the angle (either −1 or +1) (step 300). The processor then determines if Phi is positive (step 302).

If Phi is positive (a "yes" result to step 302), then the processor calculates a current iteration of equations (1), (2), and (3) in the form of:

$$X_{i+1}=X_i-Y_i*2^{-i}+Y_{ebi} \quad (14)$$

$$Y_{i+1}=Y_i+X_i*2^{-i}+X_{ebi} \quad (15)$$

$$Z_{i+1}=Z_i+\acute{\alpha} \quad (16)$$

wherein $\acute{\alpha}=-\sigma_j \tan^{-1}(2^{-1})$ (step 304).

The processor then determines whether the value of "i" has reached the value of "N," which is the number of the last iteration (step 306). If "yes," then the process terminates. If "no," then the processor calculates equations (17) and (18) below (step 308).

$$X_{eb+1}=X_{i+1}[i-1] \& X_i[i-2] \quad (17)$$

$$Y_{eb+1}=Y_{i+1}[i-1] \& Y_i[i-2] \quad (18)$$

In an illustrative example, the following iteration takes place:
I=0: X[0]=1, Y[0]=0
I=1: X[1]=X[0]−(Y[0]>>i), Y[1]=Y[0]+(X[0]>>i)
I=2: X[2]=X[1]−(Y[1]>>i), Y[2]=Y[1]+(X[1]>>i)
Note that the plus or minus sign depends on the sign of the Z value, and is assumed positive for simplification of the example.

Thus, in each iteration, starting at I=1, there is a term that is shifted to the right by one bit. After a number of shifts occur, there could potentially be a carry generated into the least significant bit. In this illustrative example, the Xeb and Yeb terms are a representation of that carry value. Hence, continuing the example:
X[1]=00111 and Y[1]=00101
X[2]=00111| and Y[2]=00101|−00010|_1_+00011|"1"
x[3]=00101 and 01000 −00010|_00_ and +00001|"01"

Thus, in this case, EbX(i=3) is the sum (retaining bit positions) of the numbers separated by underscore symbols (_); hence, 10+00=10. Similarly, EbY(i=3) is the sum of the numbers separated by quotation marks (" "); hence, 10+01=11.

As can be seen, there will be cases where there is a carry generated into the least significant bit of the X or Y term (or the Unit of Least Position of the X/Y terms)

Thus, the Eb term can be represented in multiple forms. One form is for the current Eb value which would be the Unit of Least Position of the Y[i−1] and the Unit of Least Position of the Y[i−2] term; OR the current Eb value can be represented as the error bias from the last X term "anded" with the error bias from the X two iterations in the past.

The processor then increments the value of "i" and changes the sign of Phi=sign($Z_i$) (step 310). The process then returns to step 302 and repeats.

Returning to step 302, if Phi is negative (a "no" result to step 302), then the processor calculates a current iteration of equations (1), (2), and (3) in the form of:

$$X_{i+1}=X_i+Y_i*2^{-i}+Y_{ebi} \quad (19)$$

$$Y_{i+1}=Y_i-X_i*2^{-i}+X_{ebi} \quad (20)$$

$$Z_{i+1}=Z_i+\acute{\alpha} \quad (21)$$

wherein $\acute{\alpha}=-\sigma_j \tan^{-1}(2^{-1})$ (step 312). The processor then determines whether the value of "i" has reached the value of "N," which is the number of the last iteration (step 314). If "no," then the processor calculates equations (22) and (23) below (step 316).

$$X_{eb+1}=X_{i+1}[i-1] \& X_i[i-2] \quad (22)$$

$$Y_{eb+1}=Y_{i+1}[i-1] \& Y_i[i-2] \quad (23)$$

The processor then returns to step 310 and repeats. However, if the value of "i" has reached the value of "N" at step 314, then the process terminates.

FIG. 4 is a table comparing errors generated using a prior art CORDIC algorithm versus using the improved CORDIC algorithm shown in FIG. 3, in accordance with an illustrative embodiment. The table shown in FIG. 4 can be generated by a data processing system and stored in a computer-usable medium.

The illustrative embodiments have been implemented using the C++ programming language for its ease of portability and programming flexibility. Functions were defined for shifting, adding, and subtracting x and y values for both 32 and 23 bit numbers. Once the actual CORDIC algorithm results were calculated, the x and y values were truncated by masking off the unwanted bits, which models the finite precision hardware. After the truncated results were calculated, a second mask value was used and modified iteratively to mask off the bits once again, but this time retaining an extra bit of precision for each run. Comparisons were then done to calculate error in terms of the Unit of Least Position (ULP) difference compared to the untruncated case, and data was collected as shown in FIG. 4.

Test cases were run on randomly chosen angles between the ranges of −90 to +90. The data used for analysis are the full precision CORDIC algorithm X and Y values compared against the 23 and 32 bit truncated versions as well as the modified CORDIC algorithm results. Error bias was calculated for 1ULP and 2ULP modified CORDIC algorithm, which is defined as digits to the right of the Least Significant Bit (LSB) that are lost in the traditional CORDIC algorithm by the shifting process. In these illustrative examples, the Least Significant Bit is the last number in a string of numbers. The modified results significantly reduced the error as compared to the traditional results for both the average and worse case error.

In particular, table 400 of FIG. 4 shows the results of the simulation for the pre-normalization case of the $X_i$ term over two million random rotation angle calculations. The program was run for 32 and 23 bit cycles in the following set: {29, 30, 31, 32, 33} and {20, 21, 22, 23, 24} respectively. Column three shows the results of the truncated method. Column four shows the results for the 1-ULP modified case and column five shows the results for the 2-ULP modified case. As can be seen, the method of the illustrative embodiments offers over 50% improvement in the worst-case error for both the $X_i$ and $Y_i$ terms.

FIG. 5 is a table comparing errors generated using a prior art CORDIC algorithm versus using the improved CORDIC algorithm shown in FIG. 4, in accordance with an illustrative embodiment. The table shown in FIG. 5 can be generated by a data processing system and stored in a computer-usable medium.

Table 500 of FIG. 5 is similar to table 400 shown in FIG. 4. Table 500 shows the results for the $Y_i$ term in the pre-normalization case. As with the $X_i$ term, the methods of the illustrative embodiments significantly improve the error for the $Y_i$ term.

In summary, the modified CORDIC algorithm of the illustrative embodiments reduces the error exhibited by the traditional CORDIC algorithm by adding in pre-calculated error bias into the intermediate steps of CORDIC algorithm. This illustrative embodiment can also be applied to most modern CORDIC algorithm implementations such as in high throughput applications. As a result, the illustrative embodiments described herein increase both speed and accuracy of CORDIC algorithms.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc. In a preferred embodiment, the invention is implemented in hardware. In a specific illustrative embodiment the invention is implemented in a processor or as part of a processor. In another specific illustrative embodiment, the invention is implemented as a separate circuit or chip connected to a bus of a data processing system.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented method for using a result of a calculation that was performed using a coordinate rotation digital computer (CORDIC) algorithm in digital signal processing, the method comprising the steps of:

beginning execution, by using a processor, of the CORDIC algorithm;

pre-computing, by using the processor, an error introduced by a truncated vector as a result of executing the CORDIC algorithm, wherein the error is pre-computed during the computation of output terms of the CORDIC algorithm, and wherein no delay is added to the carry propagation path;

incorporating, by using the processor, the error into a subsequent iteration of the CORDIC algorithm, wherein the error is incorporated into each iteration of the CORDIC algorithm except a first iteration of the CORDIC algorithm and a last iteration of the CORDIC algorithm;

completing execution, by using the processor, of the CORDIC algorithm;

storing, by using the processor, the result of the CORDIC algorithm in a memory;

using the result of the CORDIC algorithm in digital signal processing;

wherein the mathematical equations representing the CORDIC algorithm are modified to have the form:

$$X_i+1 = X_i -/+ Y_i * 2^i + (Y_i[i-1] \& Y_{i+1}[i-2])$$

$$Y_{i+1} = Y_i -/+ X_i * 2^i + (X_i[i-1] \& X_{i+1}[i-2])$$

wherein "X" and "Y" represent positions in Cartesian coordinates, where "i" represents an iteration number, and the symbol "&" represents a logical AND operation, wherein $X_{i+1}$ and $Y_{i+1}$ are the output terms of the CORDIC algorithm, wherein "+/−" is an addition or subtraction operation, and wherein "−/+" is a subtraction or addition operation; and wherein the error is calculated using ($Y_i[i-1]$ & $Y_{i+1}[i-2]$) and ($X_i[i-1]$ & $X_{i+1}[i-2]$).

2. The computer-implemented method of claim 1 wherein a word length of a number is represented by the symbol "N", and wherein an effective width of a fixed-width vector is increased to N+1.

3. The computer-implemented method of claim 2 wherein an effective width of a fixed-width vector is increased to N+M, wherein "M" is a number greater than one.

4. A computer program product comprising:

a non-transitory computer usable medium having computer usable program code for using a result of a calculation that was performed using a coordinate rotation digital computer (CORDIC) algorithm in digital signal processing, the computer program product including:

computer usable program code for beginning execution, by using a processor, of the CORDIC algorithm, wherein the CORDIC algorithm is used for digital signal processing;

computer usable program code for pre-computing, by using the processor, an error introduced by a truncated vector as a result of executing the CORDIC algorithm, wherein the error is pre-computed during the computation of output terms of the CORDIC algorithm, and wherein no delay is added to the carry propagation path;

computer usable program code for incorporating, by using the processor, the error into a subsequent iteration of the CORDIC algorithm, wherein the error is incorporated into each iteration of the CORDIC algorithm except a first iteration of the CORDIC algorithm and a last iteration of the CORDIC algorithm;

computer usable program code for completing execution, by using the processor, of the CORDIC algorithm;

computer usable program code for storing, by using the processor, the result of the CORDIC algorithm in a memory;

computer usable program code for using the result of the CORDIC algorithm in digital signal processing;

wherein the mathematical equations representing the CORDIC algorithm are modified to have the form:

$$X_i+1 = X_i -/+ Y_i * 2^i + (Y_i[i-1] \& Y_{i+1}[i-2])$$

$$Y_{i+1} = Y_i -/+ X_i * 2^i + (X_i[i-1] \& X_{i+1}[i-2])$$

wherein "X" and "Y" represent positions in Cartesian coordinates, where "i" represents an iteration number, and the symbol "&" represents a logical AND operation, wherein $X_{i+1}$ and $Y_{i+1}$ are the output terms of the CORDIC algorithm, wherein "+/−" is an addition or subtraction operation, and wherein "−/+" is a subtraction or addition operation; and wherein the error is calculated using ($Y_i[i-1]$ & $Y_{i+1}[i-2]$) and ($X_i[i-1]$ & $X_{i+1}[i-2]$).

5. The computer program product of claim 4 wherein a word length of a number is represented by the symbol "N", and wherein an effective width of a fixed-width vector is increased to N+1.

6. The computer program product of claim 5 wherein an effective width of a fixed-width vector is increased to N+M, wherein "M" is a number greater than one.

7. A data processing system for using a result of a calculation that was performed using a coordinate rotation digital computer (CORDIC) algorithm in digital signal processing, the data processing system comprising:

a bus;

at least one processor coupled to the bus;

a computer usable medium coupled to the bus, wherein the computer usable medium contains a set of instructions for performing a calculation using a coordinate rotation digital computer (CORDIC) algorithm, wherein the CORDIC algorithm is used for digital signal processing, wherein the at least one processor is adapted to carry out the set of instructions to:

begin execution, by using the at least one processor, of the CORDIC algorithm;

pre-compute, by using the at least one processor, an error introduced by a truncated vector as a result of executing the CORDIC algorithm, wherein the error is pre-computed during the computation of output terms of the CORDIC algorithm, and wherein no delay is added to the carry propagation path;

incorporate, by using the at least one processor, the error into a subsequent iteration of the CORDIC algorithm, wherein the error is incorporated into each iteration of the CORDIC algorithm except a first iteration of the CORDIC algorithm and a last iteration of the CORDIC algorithm;

complete execution, by using the at least one processor, of the CORDIC algorithm;

store, by using the at least one processor, the result of the CORDIC algorithm in a memory;

use the result of the CORDIC algorithm in digital signal processing;

wherein the mathematical equations representing the CORDIC algorithm are modified to have the form:

$$X_i+1 = X_i -/+ Y_i * 2^i + (Y_i[i-1] \& Y_{i+1}[i-2])$$

$$Y_{i+1} = Y_i -/+ X_i * 2^i + (X_i[i-1] \& X_{i+1}[i-2])$$

wherein "X" and "Y" represent positions in Cartesian coordinates, where "i" represents an iteration number, and the symbol "&" represents a logical AND operation, wherein $X_{i+1}$ and $Y_{i+1}$ are the output terms of the CORDIC algorithm, wherein "+/−" is an addition or subtraction operation, and wherein "−/+" is a subtraction or addition operation; and wherein the error is calculated using ($Y_i[i-1]$ & $Y_{i+1}[i-2]$) and ($X_i[i-1]$ & $X_{i+1}[i-2]$).

8. The data processing system of claim 7 wherein a word length of a number is represented by the symbol "N", and wherein an effective width of a fixed-width vector is increased to N+1.

9. The data processing system of claim 8 wherein an effective width of a fixed-width vector is increased to N+M, wherein "M" is a number greater than one.

* * * * *